(12) United States Patent
Choi et al.

(10) Patent No.: US 6,744,157 B2
(45) Date of Patent: Jun. 1, 2004

(54) OUTER ROTOR TYPE INDUCTION MOTOR (75) Inventors: Byung Keol Choi, Puchon (KR); Dong Won Kim, Kwangmyong (KR); Byoung Wook Min, Chonan (KR); Hee Tae Lim, Inchon (KR)

(73) Assignee: LG Electronics, Inc., Seoul (KR)

( * ) Notice: Subject to any disclaimer, the term of this patent is extended or adjusted under 35 U.S.C. 154(b) by 0 days.

(21) Appl. No.: 10/214,185

(22) Filed: Aug. 8, 2002

(65) Prior Publication Data
US 2003/0151315 A1 Aug. 14, 2003

(30) Foreign Application Priority Data

Feb. 8, 2002 (KR) ............................. P2002-7503
Feb. 8, 2002 (KR) ............................. P2002-7510

(51) Int. Cl.$^7$ ............................ H02K 9/00; H02K 1/32; H02K 3/12
(52) U.S. Cl. .................. 310/62; 310/58; 310/60 R; 310/180; 310/266
(58) Field of Search ............... 310/62, 179–180, 310/184–185, 254, 264–266, 58, 60 R (56) References Cited

U.S. PATENT DOCUMENTS 4,982,129 A * 1/1991 Eggert ......................... 310/216
6,384,494 B1 * 5/2002 Avidano et al. ............... 310/58

FOREIGN PATENT DOCUMENTS

| JP | 52-60905 | * | 5/1977 | ............ H02K/1/16 |
| JP | 52-143421 | * | 11/1977 | ........... H02K/17/12 |
| JP | 8-191554 | * | 7/1996 | ............ H02K/9/06 |
| JP | 8-191555 | * | 7/1996 | ............ H02K/9/06 |

* cited by examiner

Primary Examiner—Burton Mullins
(74) Attorney, Agent, or Firm—Birch, Stewart, Kolasch & Birch, LLP

(57) ABSTRACT

Disclosed is an outer rotor type induction motor. The present invention includes a driving shaft, a stator core fixed to a frame and having a plurality of stator slots so that the driving shaft penetrates a center of the stator core, a coil wound on the stator slots so as to form a rotatory magnetic field, a rotor housing installed outside the stator core so as to maintain a predetermined slit with the stator core wherein the driving shaft is coupled through a bottom center of the rotor housing, a rotor conductor coupled with an inner circumference face of the rotor housing so as to generate a torque by the rotatory magnetic field of the coil, and a plurality of upper blades installed at an upper end of the rotor housing so as to leave a predetermined interval therebetween wherein an external air is forcibly sucked in to cool the coil when the rotor housing revolves. The present invention secures sufficiently the space for coil winding to provide automation of winding the coil on the stator core, thereby enabling mass production to reduce product cost.

22 Claims, 8 Drawing Sheets

OUTER ROTOR TYPE INDUCTION MOTOR

This application claims the benefit of the Korean Application Nos. P2002-7503 and P2002-7510 filed on Feb. 8, 2002, which are hereby incorporated by reference.

BACKGROUND OF THE INVENTION

1. Field of the Invention

The present invention relates to an induction motor, and more particularly, to an outer rotor type induction motor having a rotor outside a stator.

2. Discussion of the Related Art

Generally, a motor converts an electric energy into a mechanical energy so as to provide a rotatory power. Motors are mainly divided into AC motors and DC motors, in which an induction motor is a kind of the AC motors.

The induction motors are divided again into an inner rotor type induction motor and an outer rotor type induction motor in accordance with relative positions of rotors and stators. The inner rotor type induction motor is generally applied to a washing machine or the like, and includes the rotor inside the stator.

As the rotor of the inner rotor type induction motor rotates through an inside of the stator, a radius of the rotor is limited so as to produce a less torque per unit volume as well as reduce its utilization of the inner space. Lately, proposed is an induction motor enabling to increase the torque per the same volume in a manner that the rotor is installed outside the stator as well as utilize the inner space of the stator for other usage. Such an induction motor is called an outer rotor type induction motor.

A general structure of the outer rotor type induction motor is explained briefly as follows.

Figure 1:
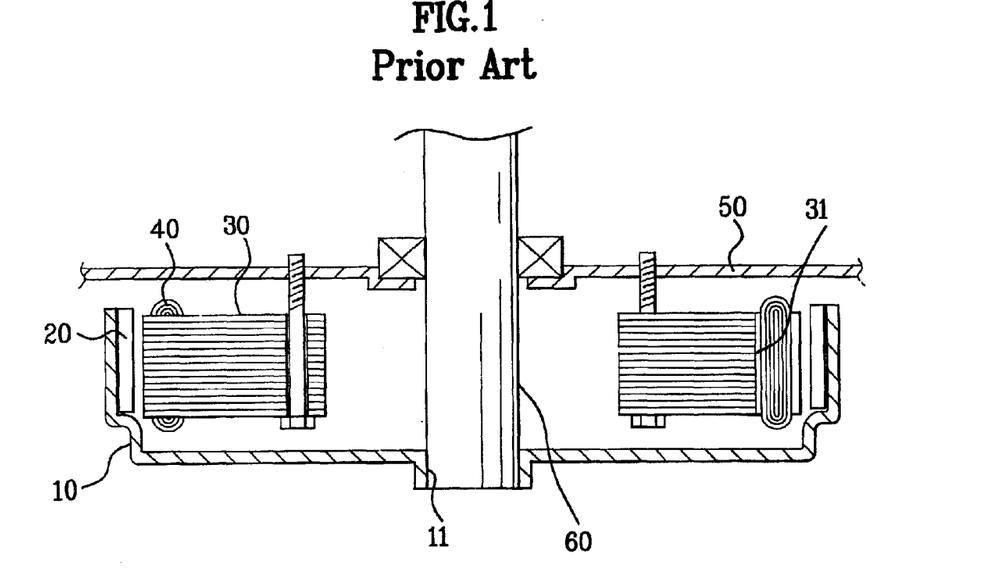
FIG. 1 illustrates a schematic cross-sectional view of a general outer rotor type induction motor.

FIG. 1 illustrates a schematic cross-sectional view of a general outer rotor type induction motor.

Referring to FIG. 1, an outer rotor type induction motor includes a rotor housing 10 with which a driving shaft 60 is coupled so as to penetrate a center of the rotor housing 10, a rotor conductor 20 installed at an inner circumference face of the rotor housing 10 so as to constitute a connected circuit, a stator core 30 fixed to a frame 50 so as to maintain a predetermined slit with the rotor conductor 20 inside the rotor housing 10, and a coil 40 installed at the stator core 30 so as to form a rotatory magnetic field by receiving an AC electric power.

In this case, the driving shaft 60 is coupled with the rotor housing 10 through an insertion hole 11 of the rotor housing 10, and then penetrates a center of the stator core 30 so as to be supported to rotate by the frame 50.

Operation of the above-constituted induction motor is schematically explained as follows. The rotatory magnetic field generated from the coil 40 inter-reacts with a current induced on the rotor conductor 20, thereby generating a torque revolving the rotor conductor 20 in accordance with Fleming's left hand rule.

Yet, in spite of the above-explained advantage, the outer rotor type induction motor has the following disadvantages or problems so as to fail to be used widely.

First, in induction motors including the outer rotor type induction motor, copper loss due to an electric resistance of the coil 40 and core loss due to leakage flux of the stator core 30 are inevitable. The copper and core losses bring about heat considerably. In this case, a temperature inside the induction motor increases so as to increase a resistance of the coil 40, thereby increasing a power loss. Specifically, if the temperature inside the induction motor is higher than that of an insulation level of the coil 40, an insulating film formed on a surface of the coil 40 is broken to reduce an endurance of the induction motor severely.

Such a problem becomes severer in the outer rotor type induction motor. As a load torque per volume of the outer rotor type induction motor works more greatly than that of the inner rotor type induction motor, such a load torque results in the temperature increase of the coil 40 directly.

Second, the outer rotor type induction motor has difficulty or weakness in winding the coil 40 on the stator core 30 automatically, whereby automatic mass-production is unavailable so as to increase a product cost.

Generally, there are various methods of winding the coil on the stator core. For instance, an inserting method is carried out by inserting the coil, which is wound previously using a winding machine, into a stator slot automatically. And, a direct winding method is carried out by winding the coil on the stator slot directly. The inserting method us applied to the inner rotor type induction motor. Despite its product cost higher than that of the direct winding method, the inserting method enables the automation so as to be applied to the mass production.

Yet, in order to apply the inserting method to the outer rotor type induction motor, new instruments including a winding machine and the like are required. Hence, the direct winding method is mainly applied to the outer rotor type induction motor. This is because the position and shape of the stator slot of the outer rotor type induction motor are absolutely different from those of the inner rotor type induction motor.

Even if the direct winding method is applied to the outer rotor type induction motor, the automation is impossible.

Figure 2:
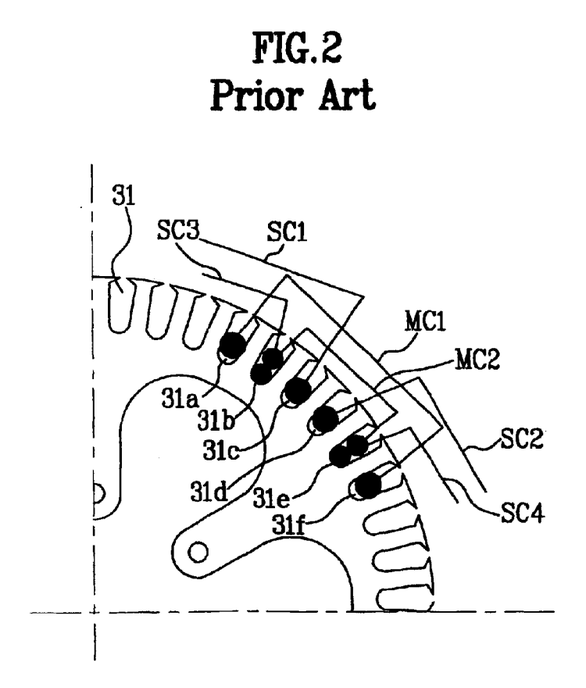
FIG. 2 illustrates a layout of a coil arrangement of the outer rotor type induction motor in FIG. 1.

Specifically, the outer rotor type induction motor, as shown in FIG. 2, needs a plurality of poles in order to attain a rotatory power. A count of the poles depends on an arrangement form of the coil. Generally, the widely used coil arrangement form constitutes eight poles using forty-eight stator slots 31.

Hence, six stator slots 31 are allocated to each of the poles, and the coil is suitably wound on the six stator slots. In this case, the coil is divided into a main winding MC as an operating winding and a supplementary winding SC as a starting winding. For convenience of explanation, random numerals are given to the main winding MC, supplementary winding SC, and stator slot 31 like FIG. 2. First, a first main winding MC1 is wound through most outer stator slots 31a and 31f among the stator slots, and then a second main winding MC2 is wound through another stator slots 31b and 31e. And, first and second supplementary windings SC1 and SC2 are wound through most inner stator slots 31c and 31d among the stator slots, respectively. In this case, third and fourth supplementary windings SC3 and SC4 are wound together through the stator slots 31b and 31e through which the second main winding MC2 is wound, respectively.

In this case, cross-sectional areas(area of a space in which the coil is wound) of the stator slots 31 are equal to each other, there is difficulty in winding the coil automatically. As the stator slot on which another coil is wound exists between the stator lots where a random coil is wound, spaces in which the coils are wound are overlapped with each other so as to bring about a competition between the coils. For instance, four stator slots 31b, 31c, 31d, and 31e are formed between the most outer stator slots 31a and 31f on which the first main winding MC1 is wound. In this case, the first main winding MC1 comes into competition with the second main winding MC2 and first to fourth supplementary windings SC1 to SC4 wound on the rest stator slots 31b, 31c, 31d, and 31e in the same space.

Unfortunately, it is substantially impossible to wind the coil automatically to bring about an automated mass production, thereby increasing a product cost. Besides, it is able to prevent the coils from competing each other in the winding space by securing the cross-sectional area of the stator slot 31 sufficiently, whereby a size of the stator core has to be increased.

SUMMARY OF THE INVENTION

Accordingly, the present invention is directed to an outer rotor type induction motor that substantially obviates one or more problems due to limitations and disadvantages of the related art.

An object of the present invention is to provide an outer rotor type induction motor enabling to improve a reliance and an endurance of a product as well as reduce its power consumption by cooling a coil smoothly.

Another object of the present invention is to provide an outer rotor type induction motor enabling an automated mass production by minimizing an reciprocally overlapped space in coil-wound spaces.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings. To achieve these objects and other advantages and in accordance with the purpose of the invention, as embodied and broadly described herein, an outer rotor type induction motor includes a driving shaft, a stator core fixed to a frame and having a plurality of stator slots so that the driving shaft penetrates a center of the stator core, a coil wound on the stator slots so as to form a rotatory magnetic field, a rotor housing installed outside the stator core so as to maintain a predetermined slit with the stator core wherein the driving shaft is coupled through a bottom center of the rotor housing, a rotor conductor coupled with an inner circumference face of the rotor housing so as to generate a torque by the rotatory magnetic field of the coil, and a plurality of upper blades installed at an upper end of the rotor housing so as to leave a predetermined interval therebetween wherein an external air is forcibly sucked in to cool the coil when the rotor housing revolves.

Therefore, the present invention makes the coil cooled by the air circulating forcibly by the upper blade, thereby enabling to overcome the decrease of the endurance and the increase of power consumption due to the temperature increase of the coil simultaneously.

In another aspect of the present invention, an outer rotor type induction motor includes a driving shaft, a stator core fixed to a frame so that a center of the stator core is penetrated by the driving shaft, a plurality of stator slots formed at the stator core so as to be in parallel with the driving shaft and differing in depth toward the driving shaft, a coil wound directly on the stator slots as a distributed winding so as to form a rotatory magnetic field, the coil comprising main and supplementary windings, a rotor housing installed outside the stator core so as to maintain a predetermined slit with the stator core wherein the driving shaft is coupled through a bottom center of the rotor housing, and a rotor conductor coupled with an inner circumference face of the rotor housing so as to generate a torque by the rotatory magnetic field of the coil.

Therefore, the present invention secures sufficiently the space failing to be overlapped between the coils with a depth difference of the stator slots, thereby enabling to wind the coil using a winding machine.

In a further aspect of the present invention, an outer rotor type induction motor includes a driving shaft, a stator core fixed to a frame so that a center of the stator core is penetrated by the driving shaft, a plurality of stator slots formed at the stator core so as to be in parallel with the driving shaft and differing in depth toward the driving shaft, a coil wound directly on the stator slots as a distributed winding so as to form a rotatory magnetic field, the coil comprising main and supplementary windings, a rotor housing installed outside the stator core so as to maintain a predetermined slit with the stator core wherein the driving shaft is coupled through a bottom center of the rotor housing, a rotor conductor coupled with an inner circumference face of the rotor housing so as to generate a torque by the rotatory magnetic field of the coil, and a plurality of upper blades installed at an upper end of the rotor housing with a predetermined interval each other so that an external air is forcibly sucked in to cool the coil when the rotor housing revolves.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

First Embodiment

Figure 3:
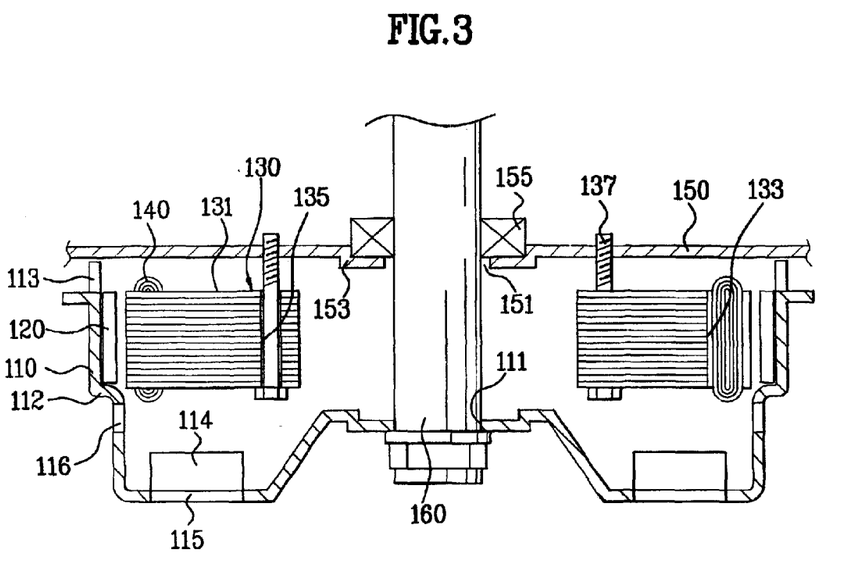
FIG. 3 illustrates a schematic cross-sectional view of an outer rotor type induction motor according to a first embodiment of the present invention.

FIG. 3 illustrates a schematic cross-sectional view of an outer rotor type induction motor according to a first embodiment of the present invention.

Referring to FIG. 3, an outer rotor type induction motor according to a first embodiment of the present invention includes a rotor housing 110 as a magnetic body with which a driving shaft 160 is coupled so as to penetrate a center of the rotor housing 110, a rotor conductor 120 installed at an inner circumference face of the rotor housing 110 so as to constitute a connected circuit, a stator core 130 fixed to a frame 150 so as to maintain a predetermined slit with the rotor conductor 120 inside the rotor housing 110, and a coil 140 installed at the stator core 130 so as to form a rotatory magnetic field by receiving an AC electric power.

The rotor housing 110 is cylindrical so that an upper face of the rotor housing 110 is open. An insertion hole 111 is formed at a lower central part of the rotor housing 110 so as to be penetrated by the driving shaft 160. And, a support end 112 is formed at a predetermined height along an inner lateral side so as to support the rotor conductor 120. In this case, the support end 112 determines a push-in depth of the rotor conductor 120.

The rotor conductor 120 is pushed in along the inner circumference face of rotor housing 110 to the support end 112 so as to generate a torque by having a current induced from the coil 140. For this, a plurality of magnetic rotor bars(not shown in the drawing) are inserted in the rotor conductor 120, whereby the rotor bars are connected to each other so as to constitute a single circuit.

The stator core 130 forms a concentric circle with the rotor housing 110 so as to form a path of a flux generated from the rotatory electric field. For this, the stator core 130 is constituted with a plurality of electric steel plates 131 of which central parts are hollow so as to be penetrated by the driving shaft 160. In this case, in order to wind the coil 140 on the stator core 130, a plurality of stator slots 133 are formed at an outer circumference face of the electric steel plates 131 so as to be in parallel with the driving shaft 160. And, in order to fix the stator core 130 to the frame 150, a coupling screw insertion hole 135 is formed at an inner circumference face of the electric steel plate 131 so as to be in parallel with the driving shaft 160. Therefore, a plurality of the electric steel plates 131 are stacked so that the stator slots 133 and coupling screw insertion hole 135 are positioned consecutively along a shaft direction, thereby constituting the stator core 130.

In this case, the stator core 130 is fixed to the frame 150 through an additional coupling bolt 137. The frame 150 is installed over the rotor housing 110, and an opening 151 is formed at a central part of the frame 150 so as to be penetrated by the driving shaft 160. In this case, a bearing installation part 153 is formed around the opening 151 of the frame 150, and a bearing 155 is installed at the bearing installation part 153 so as to support the driving shaft 160 to rotate.

Figure 4:
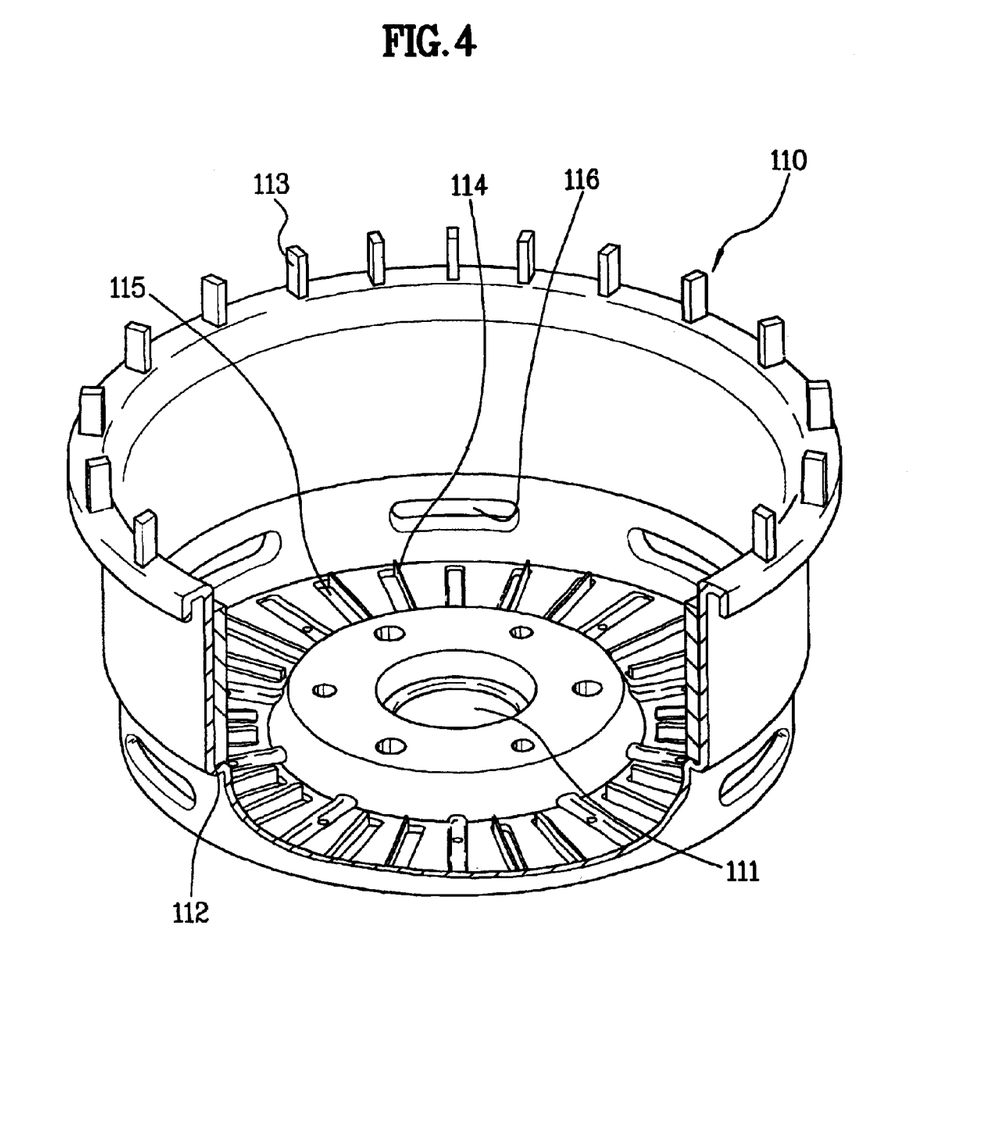
FIG. 4 illustrates a bird's-eye view of a rotor housing of the induction motor in FIG. 3.

Meanwhile, in order to cool the coil 140, as shown in FIG. 4, a plurality of blades 113 and 114 are installed at an upper end and a bottom of the rotor housing 110, respectively.

First, in order to lead a forcible circulation of an external air, a plurality of the blades 113 are installed at an upper end of the rotor housing 110. The upper blades 113 are left apart from each other with a predetermined interval, and stand erect at the upper end of the rotor housing 110. In this case, the upper blades 113 are installed in parallel with a radial direction centering round the driving shaft.

When the rotor housing 110 revolves, the upper blades 113 revolve together with the rotor housing 110 so as to lead the external air to be sucked inside the rotor housing 110. This principle is similar to that of a cross-flow fan.

Figure 5:
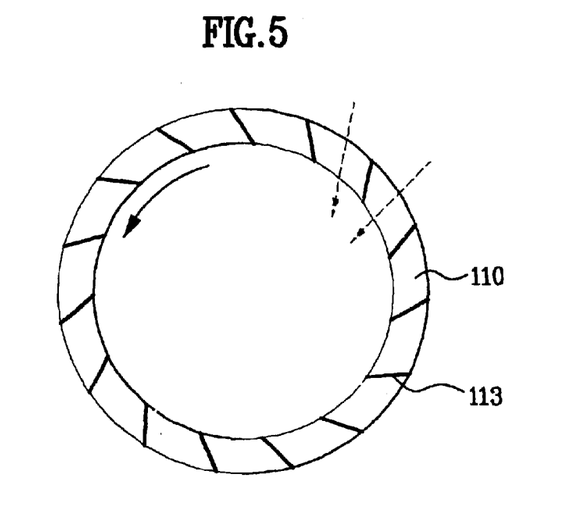
FIG. 5 illustrates a layout of a different shape of an upper blade of the induction motor in FIG. 3.

Meanwhile, in order to lead the forcible suction of the external air, the upper blades 113 are preferably installed so as to be inclined at a predetermined angle from a radial direction centering around the driving shaft, which is well shown in FIG. 5. In this case, a solid line indicates a revolving direction of the rotor housing 110 and a dotted line indicates a suction direction of the external air. Therefore, the air suction by the upper blades 113 is carried out more actively owing to the airflow characteristic.

Next, in order to lead the forcible circulation of the external air, a plurality of the lower blades 114 are formed at the bottom of the rotor housing 110. In this case, a plurality of first ventilating openings 115 are formed at the bottom of the rotor housing 110.

The first ventilating openings 115 are formed along the radial direction centering around the driving shaft, and each figure of the first ventilating openings 115 is rectangular having a long side in the radial direction. And, the lower blades 114 are installed in parallel with the radial direction centering around the driving shaft like the upper blades 113. In this case, the lower blades 114 as portions of the rotor housing 110 so as to be installed at one side of the first ventilating openings 115. For this, when the first ventilating openings 115 are made by lancing, the lower blades 114 can be naturally installed at one sides of the first ventilating openings 115, respectively.

Therefore, when the rotor housing 110 revolves, the lower blades 114 revolves together with the rotor housing 110 so as to lead the external air to be sucked inside the rotor housing through the first ventilating openings 115. This principle is similar to that of the sirocco fan.

Meanwhile, a plurality of second ventilating openings 116 are formed between the upper end and bottom of the rotor housing 110 so that air after cooling the coil is discharged through the second ventilating openings 116. Namely, the air having been sucked in through gaps between the upper blades 113 and the first ventilating openings 115 cools the coil, and then is discharged through a path formed by the second ventilating openings 116. Therefore, the second ventilating openings 116 enable to prevent the discharged air from be interfered with the sucked air.

In order to carry out such an operation smoothly, the second ventilating openings 116 are preferably formed under the support end 112 of the rotor housing 110.

Operation of the above-constituted outer rotor type induction motor is explained as follows.

Figure 6:
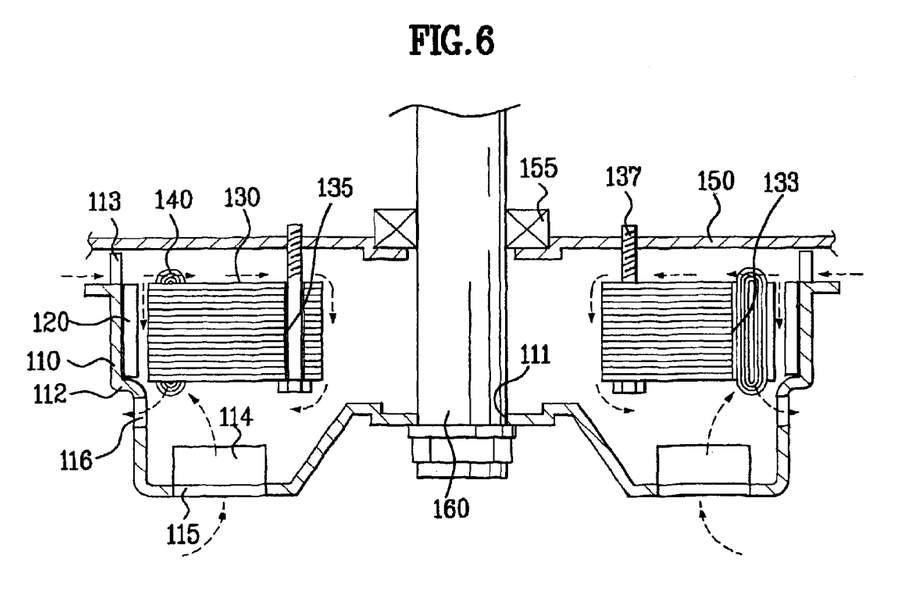
FIG. 6 illustrates a cross-sectional view of the outer rotor type induction motor in FIG. 3 for explaining its operation.

FIG. 6 illustrates a cross-sectional view of the outer rotor type induction motor in FIG. 3 for explaining its operation.

Referring to FIG. 6, when an AC power is applied to the coil 140 so as to induce a current on the rotor conductor 120, the current induced on the rotor conductor 120 generates a torque in accordance with the Fleming's left rule together with the magnetic flux revolving through the stator core 130 so that the rotor housing 110 revolves.

In this case, the lower blades 114 revolve together with the rotor housing 110, whereby the external air is forcibly sucked inside the rotor housing 110 through the first ventilating openings 115. The sucked air passes a lower part of the stator core 130, and particularly a lower part of the coil 140, so as to be discharged externally through the second ventilating openings 116. In the process of such an air circulation, the lower part of the coil 140 is exposed to the circulating air to be cooled sufficiently, thereby enabling to maintain a temperature of the entire coil 140 below a predetermined degree.

Simultaneously, the upper blades 113 revolve together with the rotor housing 110, whereby the external air is forcibly sucked inside the rotor housing 110 through spaces between the upper blades 113. The sucked air passes an upper part of the stator core 130, and particularly, an upper part of the coil 140, a space between the stator core 130 and rotor conductor 120, and a central part of the stator core 130, successively so as to be discharged externally through the second ventilating openings 116. In the process of such an air circulation, the upper part of the coil 140 is exposed to the circulating air to be cooled sufficiently, thereby enabling to maintain the temperature of the entire coil 140 below a predetermined degree.

Second Embodiment

Figure 7:
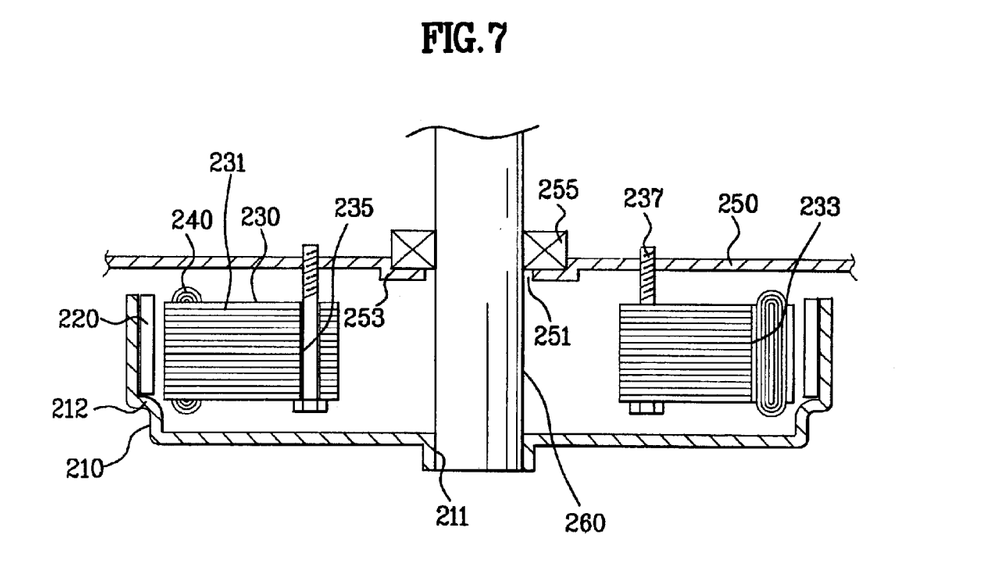
FIG. 7 illustrates a schematic cross-sectional view of an outer rotor type induction motor according to a second embodiment of the present invention.

FIG. 7 illustrates a schematic cross-sectional view of an outer rotor type induction motor according to a second embodiment of the present invention.

Referring to FIG. 7, an outer rotor type induction motor according to a second embodiment of the present invention includes a rotor housing 210 as a magnetic body with which a driving shaft 260 is coupled so as to penetrate a center of the rotor housing 210, a rotor conductor 220 installed at an inner circumference face of the rotor housing 210 so as to constitute a connected circuit, a stator core 230 fixed to a frame 250 so as to maintain a predetermined slit with the rotor conductor 220 inside the rotor housing 210, and a coil 240 installed at the stator core 230 so as to form a rotatory magnetic field by receiving an AC electric power.

The rotor housing 210 is cylindrical so that an upper face of the rotor housing 210 is open. An insertion hole 211 is formed at a lower central part of the rotor housing 210 so as to be penetrated by the driving shaft 260. And, a support end 212 is formed at a predetermined height along an inner lateral side so as to support the rotor conductor 220.

The rotor conductor 220 is pushed in along the inner circumference face of rotor housing 210 so as to generate a torque by having a current induced from the coil 240. For this, a plurality of magnetic rotor bars(not shown in the drawing) are inserted in the rotor conductor 220, whereby the rotor bars are connected to each other so as to constitute a single circuit.

The stator core 230 forms a concentric circle with the rotor housing 210 so as to form a path of a magnetic flux generated from the rotatory electric field. For this, the stator core 230 is constituted with a plurality of electric steel plates 231 of which central parts are hollow respectively so as to be penetrated by the driving shaft 260. In this case, in order to wind the coil 240 on the stator core 230, a plurality of stator slots 233 are formed at an outer circumference face of the electric steel plates 231 so as to be in parallel with the driving shaft 260. And, in order to fix the stator core 230 to the frame 250, a coupling screw insertion hole 235 is formed at an inner circumference face of the electric steel plate 231 so as to be in parallel with the driving shaft 260. Therefore, a plurality of the electric steel plates 231 are stacked so that the stator slots 233 and coupling screw insertion hole 235 are positioned consecutively along a shaft direction, thereby constituting the stator core 230.

In this case, the stator core 230 is fixed to the frame 250 through an additional coupling bolt 237. The frame 250 is installed over the rotor housing 210, and an opening 251 is formed at a central part of the frame 250 so as to be penetrated by the driving shaft 260. In this case, a bearing installation part 253 is formed around the opening 251 of the frame 250, and a bearing 255 is installed at the bearing installation part 253 so as to support the driving shaft 260 to rotate.

The coil 240 is not inserted through the opening of the stator slots 233 by being previously wound but wound on the stator slots 233 directly through a winding machine so as to have a figure of a distributed winding.

Figure 8A:
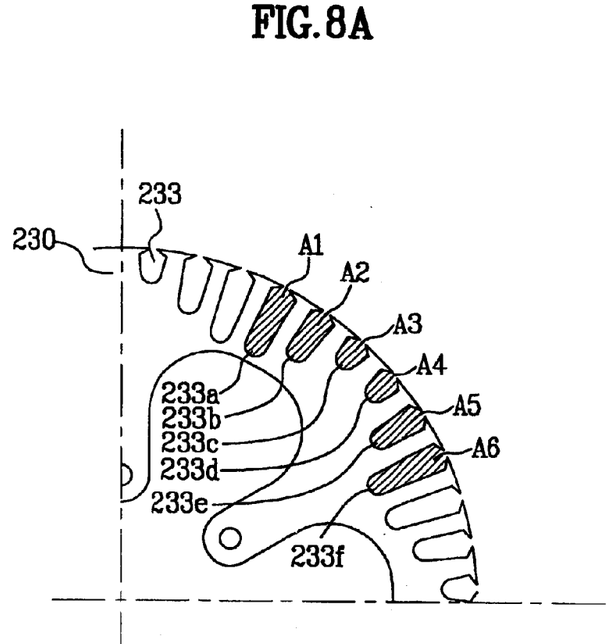
FIG. 8A illustrates a layout of a stator core of the outer rotor type induction motor in FIG. 7.
Figure 8B:
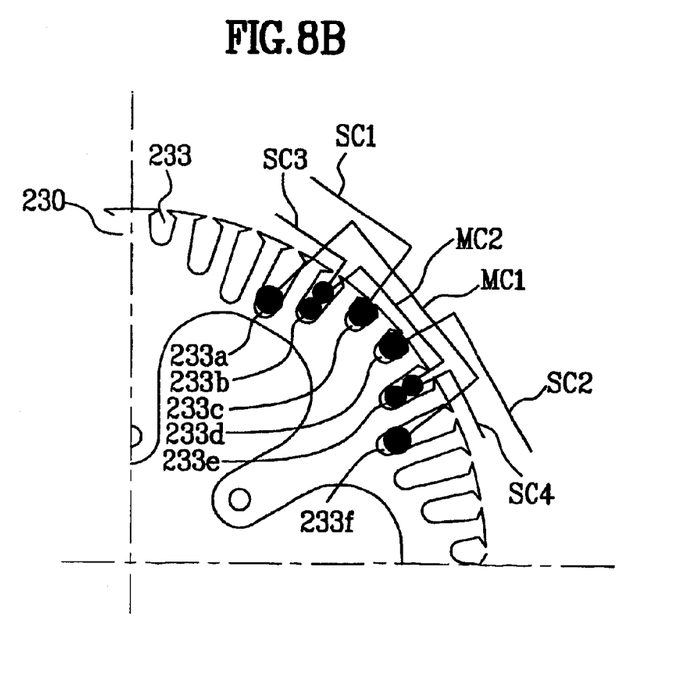
FIG. 8B illustrates a layout of a coil arrangement of the outer rotor type induction motor in FIG. 8A.

Meanwhile, forty-eight stator slots are formed radially at the stator core 230 with a predetermined interval each other so as to form eight poles, which are shown in FIG. 8A and FIG. 8B in part. Therefore, six stator slots 233 are allocated to each of the poles. In this case, numerals are given to the stator slots 233 for convenience of explanation.

FIG. 8A illustrates a layout of a stator core of the outer rotor type induction motor in FIG. 7 and FIG. 8B illustrates a layout of a coil arrangement of the outer rotor type induction motor in FIG. 8A.

Referring to FIG. 8A and FIG. 8B, the stator slots 233 are formed so as to differ each other in depth toward the driving shaft in accordance with positions of the stator slots 233 respectively. This is for securing a sufficient winding space so that the coil wound on the stator slots 233 is not overlapped. In this case, the stator slots 233 have three kinds of depths, respectively so as to cope with a first case that a main winding MC is wound, a second case that a supplementary winding SC is wound, and a third case that the main and supplementary windings MC and SC are commonly wound, respectively. In this case, the main winding MC is an operating winding and the supplementary winding SC is a starting winding.

Specifically, the most outer stator slots 233a and 233f among the consecutive six stator slots are the deepest, the next stator slots 233b and 233e are deeper, and the most inner stator slots 233c and 233d are shallow. In this case, a first main winding MC1 is wound through the deepest stator slots 233a and 233f, first and second supplementary windings SC1 and SC2 are wound through the shallow stator slots 233c and 233d, and a second main winding MC2 and third and fourth supplementary windings SC3 and SC4 are wound commonly through the deeper stator slots 233b and 233e. In this case, the first main winding MC1 is located at the most inner side of the stator core 230, the first and second supplementary windings SC1 and SC2 are located at the most outer side of the stator core 230, and the second main winding MC2 and third and fourth supplementary windings SC3 and SC4 are located therebetween, which are well shown in FIG. 8B. Therefore, the winding spaces between the coil are not overlapped with each other so as to enable the winding machine to wind the coil automatically.

In this case, a depth difference between the stator slots 233 should be determined by a predetermined ratio so that the winding spaces of the main and supplementary windings MC and SC are not overlapped with each other within a range failing to increase a size of the stator core 230. If widths of the stator slots 233 are equal to each other, a depth ratio of the stator slots 233 can be expressed by an area ratio. Therefore, the present invention takes cross-sectional areas A1 and A6 of the most outer stator slots 233a and 233f which are the deepest as reference cross-sectional areas. And, the present invention proposes that cross-sectional areas A2 and A5 of the stator slots 233b and 233e on which the main and supplementary windings are commonly wound become 60~80% of the reference cross-sectional areas and that cross-sectional areas A3 and A4 of the most inner stator slots 233c and 233d on which the supplementary winding is wound only are 50~70% of the reference cross-sectional areas.

Meanwhile, it is also able to switch the depths of the stator slots 233a and 233f on which the main winding is wound only and the other stator slots 233c and 233d on which the supplementary winding is wound only to each other.

Figure 9A:
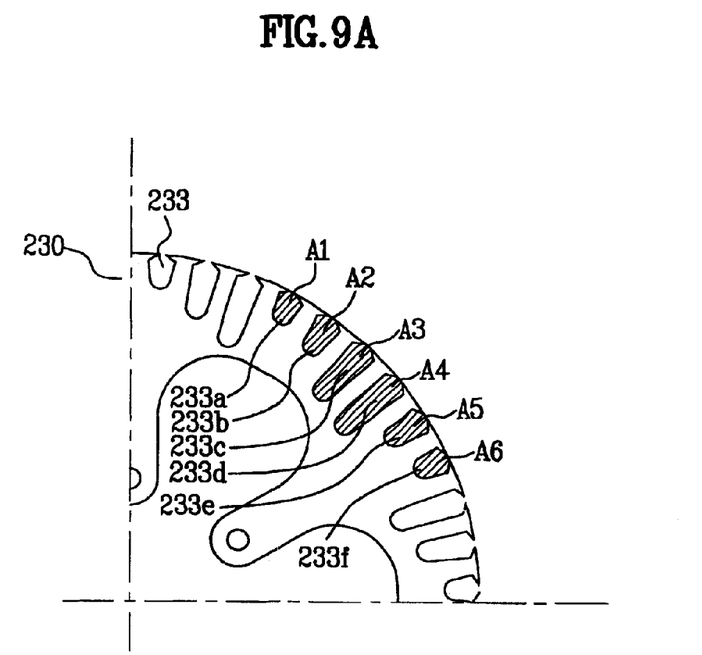
FIG. 9A illustrates in part a layout of a different stator core of the outer rotor type induction motor in FIG. 7.
Figure 9B:
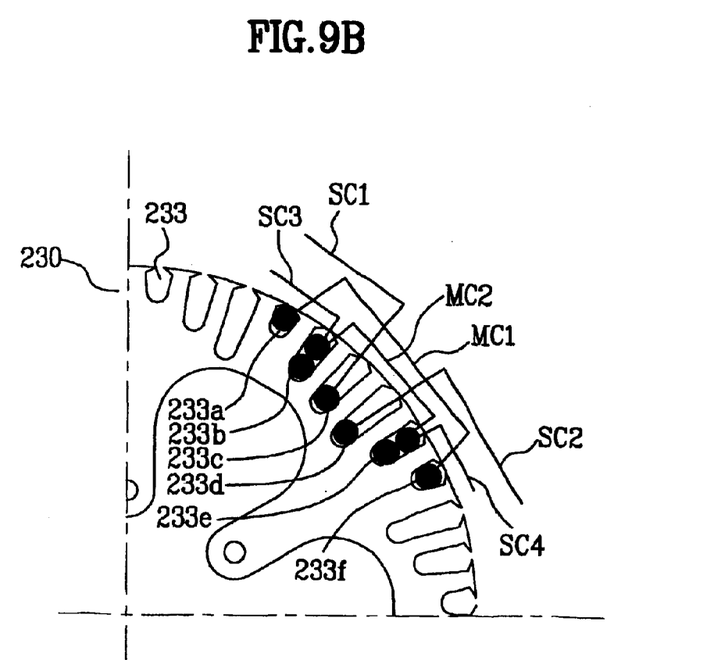
FIG. 9B illustrates a layout of a coil arrangement of the outer rotor type induction motor in FIG. 9A.

FIG. 9A illustrates in part a layout of a different stator core of the outer rotor type induction motor in FIG. 7 and FIG. 9B illustrates a layout of a coil arrangement of the outer rotor type induction motor in FIG. 9A.

Referring to FIG. 9A and FIG. 9B, the most inner stator slots 233c and 233d on which the first and second supplementary windings SC1 and SC2 are wound among the stator slots are formed to be the deepest, another stator slots 233b and 233e on which the second main winding MC2 and third and fourth supplementary windings SC3 and SC4 are wound are formed to be the deeper, and the most outer stator slots 233a and 233f on which the first main winding MC1 is wound only are formed to be shallow. In this case, the first main winding MC1 is located at a most outer side of the stator core 230, the first and second supplementary windings SC1 and SC2 are located at the most inner side of the stator core 230, and the second main winding MC2 and third and fourth supplementary windings SC3 and SC4 are located therebetween. Therefore, the winding spaces between the coil are not overlapped with each other so as to enable the winding machine to wind the coil automatically as well.

In this case, the present invention takes cross-sectional areas A3 and A4 of the most inner stator slots 233c and 233d on which the supplementary windings SC1 and SC2 are wound only as reference cross-sectional areas. Then, cross-sectional areas A2 and A5 of the stator slots 233b and 233e on which the main and supplementary windings MC2, SC3, and SC4 are commonly wound preferably become 60~80% of the reference cross-sectional areas. And, cross-sectional areas A1 and A6 of the most outer stator slots 233a and 233f on which the main winding MC1 is wound only are preferably 50~70% of the reference cross-sectional areas.

The first and second embodiments of the present invention are characterized in being applied to the outer rotor type induction motor. In this case, the present invention guarantees the cooling of coil, thereby enabling to reduce power consumption as well as improve a reliance of product. Besides, the present invention secures the winding space of the coil so as to enable automated mass production.

Meanwhile, the outer rotor type induction motor according to the present invention can be applied to a washing machine as a motor for driving a washing shaft, which is explained schematically as follows.

Figure 10:
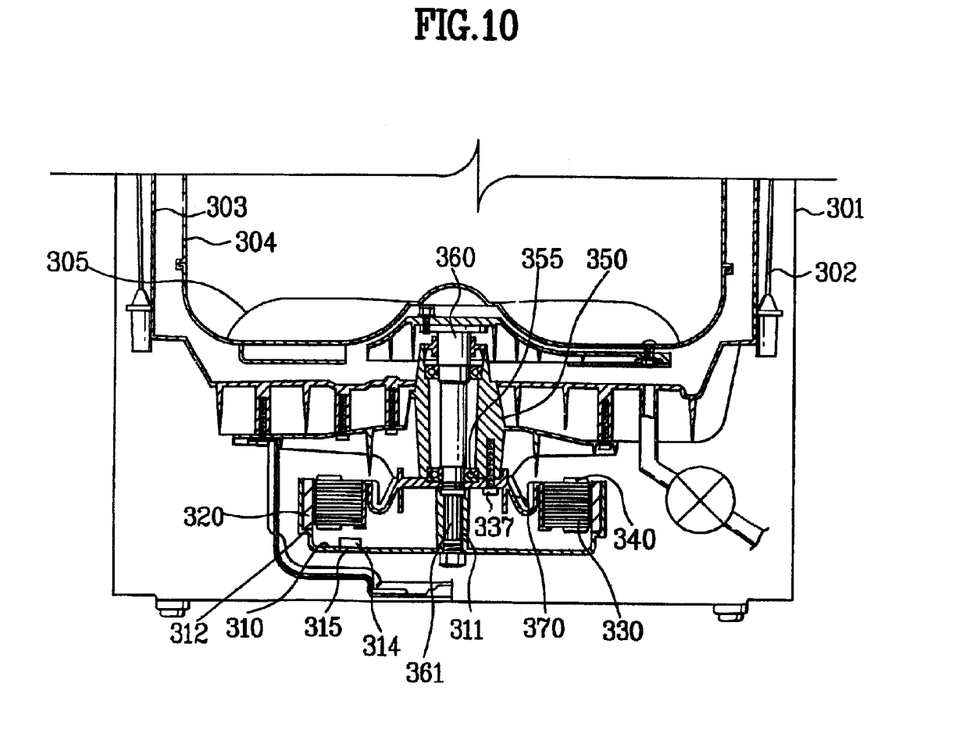
FIG. 10 illustrates a cross-sectional view of a washing machine to which an outer rotor type induction motor according to the present invention is applied.

FIG. 10 illustrates a cross-sectional view of a washing machine to which an outer rotor type induction motor according to the present invention is applied.

Referring to FIG. 10, a washing machine according to the present invention is a direct-coupling type washing machine transferring a driving power of a motor to a washing shaft directly without a belt or pulley. A water tank 303 keeping a washing water in store inside a body 301 is elastically supported by a suspension 302. A washing vessel 304 receiving a laundry inside the water tank 303 is installed so as to revolve. And, a pulsator 305 is coupled with the washing vessel 304 so as to generate a water current from a bottom center of the washing vessel 304. In this case, the washing shaft 360 is directly coupled with the pulsator 305 so that the washing vessel 304 and pulsator 305 revolve in one body when the washing shaft 360 rotates.

A bearing housing 350 is formed at a lower end of the water tank 303, and a pair of bearings 355 are installed up and down inside the bearing housing 350 so as to support the washing shaft 360 to rotate.

A motor making the washing shaft 360 rotate is installed below the bearing housing 350, and includes a rotor housing 310 installed under the bearing housing 350 and with which the washing shaft 360 is coupled so as to penetrate a bottom center of the rotor housing 310, a rotor conductor 320 installed at an inner circumference face of the rotor housing 310 so as to constitute a connected circuit, a stator core 330 coupled with a bottom of the bearing housing 350 and installed inside the rotor housing 310 so as to maintain a predetermined slit with the rotor conductor 320, and a coil 340 installed at the stator core 330 so as to form a rotatory magnetic field by receiving an AC electric power.

A plurality of electric steel plates, of which central parts are hollow to be penetrated by the washing shaft 360, are stacked so as to constitute the stator core 330. And, the stator core 330 is fixed by an additional support member 370. In this case, the support member 370 is coupled with the bottom of the bearing housing 350 through a coupling bolt 337 so that the stator core 330 can be fixed to the bearing housing 350. In this case, a plurality of stator slots are formed at an outer circumference of the stator core 330 so as to be in parallel with a shaft direction, and the coil 340 is wound through the stator slots.

The coil 340 is not inserted through the openings of the stator slots by being previously wound but wound on the stator slots 233 directly through a winding machine so as to have a figure of a distributed winding.

The rotor housing 310 has a cylindrical figure of which upper face is open. An insertion pipe 311 having a predetermined length is formed at a central bottom part of the rotor housing 310 so as to be matched to a serration part 361. A support end 312 is formed along a lateral side of the rotor housing 310 so as to support the rotor conductor 320. A plurality of bottom ventilating openings 315 and lower blades 314 are formed at a bottom of the rotor housing 310 so as to cool the coil 340 and lead a forcible circulation of air, respectively. In this case, since the upper face of the rotor housing 310 is open, it is unnecessary to install additional blades at the upper end of the rotor housing 310 or lateral ventilating openings at a lateral side of the rotor housing 310 to discharge the air. In this case, the air sucked in through the bottom ventilating openings 315 cools the coil 340, and then is discharged through the opened upper face of the rotor housing 310 externally.

Meanwhile, the stator slots formed at the stator core 330, as mentioned in the above description, formed to have different depths toward the washing shaft 360. This for securing the winding space sufficiently so that the coil 340 wound on the stator slots fails to be overlapped with other. In this case, the stator slots have three kinds of depths so as to cope with a first case that a main winding is wound, a second case that a supplementary winding is wound, and a third case that the main and supplementary windings are commonly wound, respectively.

The characteristics of the stator slots are well shown in FIG. 8A to FIG. 9B, of which explanation is skipped.

Meanwhile, the outer rotor type induction motor according to the present invention inter-operates with a clutch, and can be applied to a washing machine having washing and dehydrating shafts separated from each other. In this case, a clutch may be installed inside the stator core so as to be in charge of power transfer of the washing and dehydrating shafts.

Accordingly, the outer rotor type induction motor according to the present invention has the following effects or advantages.

First, the rotor housing coupled with the driving shaft is installed outside the stator core so as to generate a torque bigger than that of the previous inner rotor type induction motor per unit volume.

Second, the rotor housing coupled with the driving shaft is installed outside the stator core to secure the inner space of the stator core, thereby enabling to increase space utilization.

Third, the external air is forcibly circulated through the upper/lower blades and ventilating openings formed at the rotor housing to cool the coil more actively, thereby enabling to reduce power consumption as well as elongate an endurance.

Fourth, the present invention secures sufficiently the space for coil winding to provide automation of winding the coil on the stator core, thereby enabling mass production to reduce product cost.

It will be apparent to those skilled in the art than various modifications and variations can be made in the present invention. Thus, it is intended that the present invention covers the modifications and variations of this invention provided they come within the scope of the appended claims and their equivalents.

What is claimed is:

1. An outer rotor induction motor, comprising:
   a driving shaft;
   a stator core fixed to a frame and having a plurality of stator slots so that the driving shaft penetrates a center of the stator core;
   a coil wound in the stator slots so as to form a rotating magnetic field;
   a rotor housing installed outside the stator core so as to maintain a predetermined air gap with the stator core wherein the driving shaft is coupled to the rotor housing through a bottom center of the rotor housing;
   a rotor conductor coupled with an inner circumference face of the rotor housing so as to generate a torque through interaction with the rotating magnetic field of the coil;
   a plurality of upper blades installed at an upper end of the rotor housing so as to leave a predetermined interval between the upper blades, wherein external air is forcibly sucked in to cool the coil when the rotor housing revolves;
   a plurality of first ventilating openings formed at a bottom of the rotor housing; and
   a plurality of lower blades formed on the rotor housing along side edges of a plurality of the first ventilating openings,
   whereby external air is forcibly sucked in through the first ventilating openings when the rotor housing revolves.

2. The outer rotor induction motor of claim 1, wherein the upper blades are installed in parallel with a radial direction centering around the driving shaft.

3. The outer rotor induction motor of claim 1, wherein the upper blades are installed so as to be inclined at a predetermined angle from a radial direction centering around the driving shaft.

4. The outer rotor induction motor of claim 1, wherein a lower blade of the plurality of lower blades is installed at one side edge of each of the first ventilating openings.

5. The outer rotor induction motor of claim 1, wherein the first ventilating openings and the lower blades are formed along a radial direction centering around the driving shaft.

6. An outer rotor induction motor, comprising:
   a driving shaft;
   a stator core fixed to a frame and having a plurality of stator slots so that the driving shaft penetrates a center of the stator core;
   a coil wound in the stator slots so as to form a rotating magnetic field;
   a rotor housing installed outside the stator core so as to maintain a predetermined air gap with the stator core wherein the driving shaft is coupled to the rotor housing through a bottom center of the rotor housing;
   a rotor conductor coupled with an inner circumference face of the rotor housing so as to generate a torgue through interaction with the rotating magnetic field of the coil;
   a plurality of upper blades installed at an upper end of the rotor housing so as to leave a predetermined interval between the upper blades, wherein external air is forcibly sucked in to cool the coil when the rotor housing revolves; and
   a plurality of second ventilating openings formed between the upper end and bottom of the rotor housing.

7. An outer rotor induction motor, comprising:
   a driving shaft;
   a stator core fixed to a frame so that a center of the stator core is penetrated by the driving shaft;
   a plurality of stator slots formed in the stator core so as to be in parallel with the driving shaft and differing in depth toward the driving shaft;
   a coil wound directly in the stator slots as a distributed winding so as to form a rotating magnetic field, the coil comprising main and supplementary windings;
   a rotor housing installed outside the stator core so as to maintain a predetermined air gap with the stator core wherein the driving shaft is coupled to the rotor housing through a bottom center of the rotor housing; and
   a rotor conductor coupled with an inner circumference face of the rotor housing so as to generate a torgue through interaction with the rotating magnetic field of the coil,
   wherein the stator slots differ in three kinds of depths, and
   wherein the stator slots on which the main winding is wound only are deepest ones and the stator slots on which the supplementary winding is wound are shallowest ones.

8. The outer rotor induction motor of claim 7, when a cross-sectional area of the stator slot on which the main winding is wound only is taken as a reference cross-sectional area, wherein a cross-sectional area of the stator slot on which the main and supplementary windings are commonly wound is 60~80% of the reference cross-sectional area and a cross-sectional area of the stator slot on which the supplementary winding is wound only is 50~70% of the reference cross-sectional area.

9. An outer rotor induction motor, comprising:
a driving shaft;
a stator core fixed to a frame so that a center of the stator core is penetrated by the driving shaft;
a plurality of stator slots formed in the stator core so as to be in parallel with the driving shaft and differing in depth toward the driving shaft;
a coil wound directly in the stator slots as a distributed winding so as to form a rotating magnetic field, the coil comprising main and supplementary windings;
a rotor housing installed outside the stator core so as to maintain a predetermined air gap with the stator core wherein the driving shaft is coupled to the rotor housing through a bottom center of the rotor housing; and
a rotor conductor coupled with an inner circumference face of the rotor housing so as to generate a torgue through interaction with the rotating magnetic field of the coil,
wherein the stator slots differ in three kinds of depths, and
wherein the stator slots on which the supplementary winding is wound only are deepest ones and the stator slots on which the main winding is wound only are shallowest ones.

10. The outer rotor induction motor of claim 9, when a cross-sectional area of the stator slot on which the supplementary winding is wound only is taken as a reference cross-sectional area, wherein a cross-sectional area of the stator slot on which the main and supplementary windings are commonly wound is 60~80% of the reference cross-sectional area and a cross-sectional area of the stator slot on which the main winding is wound only is 50~70% of the reference cross-sectional area.

11. An outer rotor induction motor, comprising:
a driving shaft;
a stator core fixed to a frame so that a center of the stator core is penetrated by the driving shaft;
a plurality of stator slots formed in the stator core so as to be in parallel with the driving shaft and differing in depth toward the driving shaft;
a coil wound directly in the stator slots as a distributed winding so as to form a rotating magnetic field, the coil comprising main and supplementary windings;
a rotor housing installed outside the stator core so as to maintain a predetermined air gap with the stator core wherein the driving shaft is coupled to the rotor housing through a bottom center of the rotor housing;
a rotor conductor coupled with an inner circumference face of the rotor housing so as to generate a torque by through interaction with the rotating magnetic field of the coil;
a plurality of upper blades installed at an upper end of the rotor housing with a predetermined interval between the upper blades so that external air is forcibly sucked in to cool the coil when the rotor housing revolves;
a plurality of first ventilating openings formed at a bottom of the rotor housing; and
a plurality of lower blades formed on the rotor housing along side edges of a plurality of the first ventilating openings,
whereby external air is forcibly sucked in through the first ventilating openings when the rotor housing revolves.

12. The outer rotor induction motor of claim 11, wherein the stator slots differs in three kinds of depths.

13. An outer rotor induction motor, comprising:
a driving shaft;
a stator core fixed to a frame so that a center of the stator core is penetrated by the driving shaft;
a plurality of stator slots formed in the stator core so as to be in parallel with the driving shaft and differing in depth toward the driving shaft;
a coil wound directly in the stator slots as a distributed winding so as to form a rotating magnetic field, the coil comprising main and supplementary windings;
a rotor housing installed outside the stator core so as to maintain a predetermined air gap with the stator core wherein the driving shaft is coupled to the rotor housing through a bottom center of the rotor housing;
a rotor conductor coupled with an inner circumference face of the rotor housing so as to generate a torgue through interaction with the rotating magnetic field of the coil; and
a plurality of upper blades installed at an upper end of the rotor housing with a predetermined interval between the upper blades so that external air is forcibly sucked in to cool the coil when the rotor housing revolves,
wherein the stator slots differs in three kinds of depths, and
wherein the stator slots on which the main winding is wound only are deepest ones and the stator slots on which the supplementary winding is wound are shallowest ones.

14. The outer rotor induction motor of claim 11, the upper blades are installed in parallel with a radial direction centering around the driving shaft.

15. The outer rotor induction motor of claim 11, wherein the upper blades are installed so as to be inclined at a predetermined angle from a radial direction centering around the driving shaft.

16. The outer rotor induction motor of claim 11, wherein a lower blade of the plurality of lower blades is installed at one side edge of each of the first ventilating openings.

17. The outer rotor induction motor of claim 11, wherein the first ventilating openings and the lower blades are formed along a radial direction centering around the driving shaft.

18. An outer rotor induction motor, comprising:
a driving shaft;
a stator core fixed to a frame so that a center of the stator core is penetrated by the driving shaft;
a plurality of stator slots formed in the stator core so as to be in parallel with the driving shaft and differing in depth toward the driving shaft;
a coil wound directly in the stator slots as a distributed winding so as to form a rotating magnetic field, the coil comprising main and supplementary windings;
a rotor housing installed outside the stator core so as to maintain a predetermined air gap with the stator core wherein the driving shaft is coupled to the rotor housing through a bottom center of the rotor housing;
a rotor conductor coupled with an inner circumference face of the rotor housing so as to generate a torgue through interaction with the rotating magnetic field of the coil;
a plurality of upper blades installed at an upper end of the rotor housing with a predetermined interval between the upper blades so that external air is forcibly sucked in to cool the coil when the rotor housing revolves; and a plurality of ventilating openings formed between the upper end and bottom of the rotor housing.

19. An outer rotor induction motor, comprising:

a driving shaft;

a stator core fixed to a frame and having a plurality of stator slots so that the driving shaft penetrates a center of the stator core;

a coil wound in the stator slots so as to form a rotating magnetic field;

a rotor housing installed outside the stator core so as to maintain a predetermined air gap with the stator core wherein the driving shaft is coupled to the rotor housing through a bottom center of the rotor housing;

a rotor conductor coupled with an inner circumference face of the rotor housing so as to generate a torque through interaction with the rotating magnetic field of the coil;

a plurality of first ventilating openings formed in a bottom of the rotor housing; and a plurality of lower blades formed on the rotor housing along side edges of a plurality of the first ventilating openings, whereby external air is forcibly sucked in through the first ventilating openings when the rotor housing revolves.

20. The outer rotor induction motor of claim 19, wherein a lower blade of the plurality of lower blades is installed at one side edge of each of the first ventilating openings.

21. The outer rotor induction motor of claim 19, wherein the first ventilating openings and the lower blades are formed along a radial direction centering around the driving shaft.

22. The outer rotor induction motor of claim 19, wherein a plurality of second ventilating openings are formed between the upper end and bottom of the rotor housing.

* * * * *